United States Patent [19]

Schroeder

[11] Patent Number: 4,731,813
[45] Date of Patent: * Mar. 15, 1988

[54] ADDRESS ENCODING SYSTEM FOR PORTABLE BATTERY-OPERATED DEVICES

[75] Inventor: Daniel R. Schroeder, Glen Ellyn, Ill.

[73] Assignee: Motorola, Inc., Schaumburg, Ill.

[*] Notice: The portion of the term of this patent subsequent to Jun. 3, 2003 has been disclaimed.

[21] Appl. No.: 567,027

[22] Filed: Dec. 30, 1983

[51] Int. Cl.$^4$ .......................................... H04M 11/00
[52] U.S. Cl. ..................................... 379/62; 379/413
[58] Field of Search .......... 340/310 R, 825.44, 310 A; 179/2 EA, 2 BC; 379/95, 62, 413; 380/23, 59

[56] References Cited

U.S. PATENT DOCUMENTS

| | | | |
|---|---|---|---|
| 3,476,882 | 11/1969 | Vogelman et al. | 179/2 EA |
| 4,139,737 | 2/1979 | Shimada et al. | 340/310 A |
| 4,185,272 | 1/1980 | Feiker | 340/310 R |
| 4,422,071 | 12/1983 | De Graaf | 340/825.44 |
| 4,458,111 | 7/1984 | Sugihara | 179/2 BC |
| 4,535,200 | 8/1985 | Himmelbauer et al. | 179/2 EA |
| 4,558,177 | 12/1985 | Corris et al. | 179/2 EA |
| 4,593,155 | 6/1986 | Hawkins | 179/2 EA |

FOREIGN PATENT DOCUMENTS 1295503 11/1972 United Kingdom.

Primary Examiner—Thomas H. Tarcza
Assistant Examiner—Aaron J. Lewis
Attorney, Agent, or Firm—Phillip H. Melamed

[57] ABSTRACT

A two-way radio communications system includes a battery-operated portable unit and a base unit having a receptacle for receiving the portable unit when the portable unit is not in use. A security circuit in each unit allows communication with other units only upon the reception of an address code corresponding to an address code stored in the unit. When the portable unit is seated in the base unit receptacle, the batteries of the portable unit are recharged by current supplied by the base unit. At the same time, the address code of the base unit is entered into the portable unit by encoding circuitry which modulates the battery charging current in accordance with the address code. Circuitry within the portable unit demodulates the charging current to recover the address code for storage in the security circuit of the portable unit. The invention can also be used in systems where data other than address codes must be sent to a unit being charged.

26 Claims, 3 Drawing Figures

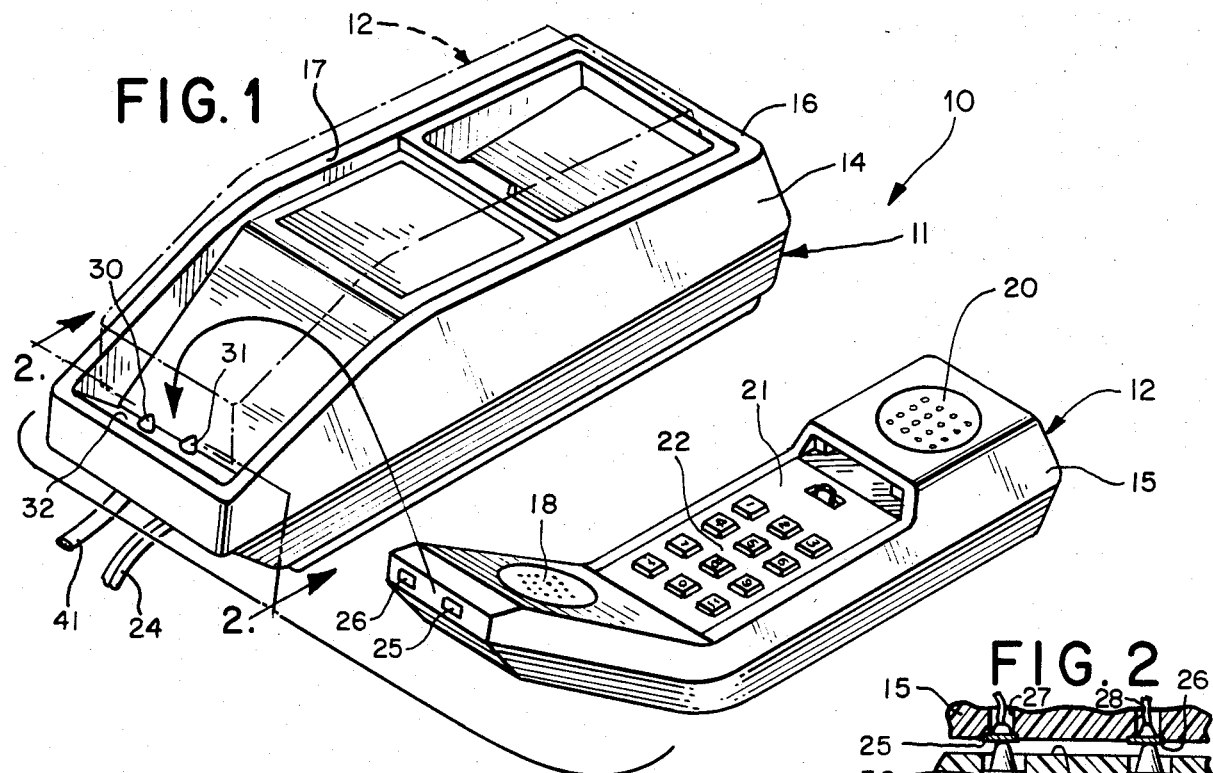

ADDRESS ENCODING SYSTEM FOR PORTABLE BATTERY-OPERATED DEVICES

BACKGROUND OF THE INVENTION

The present invention relates generally to methods and systems for providing a portable communication unit with a predetermined identification (ID) code to enable it to communicate with a base unit having a corresponding ID code, and more particularly to a method and system for providing a portable communication unit with an ID code through modulation of battery charging current.

Presently, there exist a variety of communication systems in which one or more battery operated portable units communicate with a central base station unit. Examples of such systems include portable telephone systems, garage door opener and remote computer terminals which communicate with a master computer. In such systems, and particularly in those wherein a number of portable units communicate with a base unit by means of radio signals, it is desirable that each portable unit communicates only with a given base unit, and similarly that each base unit communicates only with a specified group of portable units. This is particularly true where a number of radio communication systems operate on a shared frequency and communications are intended for only specified ones of the many portable units tuned to the common frequency. Numerous systems for providing such limitations have been developed and typically involve storing an electronic ID code in both the base unit and the portable units and then checking fo correspondence between the codes thus stored prior to establishing a communications link.

With such communications systems, it is necessary to encode each portable unit of the system so that the codes stored therein correspond to that stored in the system base station unit. A variety of code storage techniques have been developed including providing the units with hard-wired circuitry for generating a code, providing each unit with a removable programmable ID storage element or "code plug", or providing each unit with memory circuitry into which a user manually enters a code prior to use.

Each of these methods has drawbacks which adversely affect the effectiveness of the communication system. For example, the use of hard-wired circuitry to generate a code requires each unit to be individually wired in a unique manner which greatly increases manufacturing costs. Similarly, the use of code plugs requires each code plug to be uniquely programmed prior to its installation in a communication unit. When manual programming of each unit is provided, generally only a relatively few user-selected codes are available in order to avoid excessive manufacturing costs. Accordingly, the provision of relatively few available ID codes increases the likelihood that other users could accidentally or intentionally select the same codes, thereby compromising the security of the communication system. A further drawback of such systems is that when it is desired to purchase either a new base unit or portable unit for use in an existing system, it is necessary for either the manufacturer or the purchaser to assure that the unit obtained contains the proper code for allowing communication with other units of the system.

The present invention is directed to a method and apparatus for automatically transferring an ID code from a given base station unit to any compatible portable unit for storage therein when the portable unit is conductively mated with the base unit such as during battery charging. The system has the advantage that any compatible portable unit may thus be used with any base unit without the need for manually altering circuit components or manually programming the portable unit. Since it is necessary to mate each intended portable unit with the base station prior to allowing remote communication between the units, security of the system is maintained. Furthermore, the system provides a great deal of flexibility since a user may program as many or as few portable units as is necessary to meet his needs at any given moment.

In one such system in which a base unit provides an ID code to a portable unit, a third conductor, dedicated to transferring ID code information, was provided in addition to the two conductors needed to charge the battery of the portable battery. This system is described in the copending application of George C. Hawkins, entitled "Portable Telephone ID Code Transfer System", Ser. No. 558,738, filed Dec,. 5, 1983, and assigned to the assignee of the present invention. The present invention avoids the necessity for such an additional conductor since the present system relies on modulation of battery charging current in order to transfer ID code information. Elimination of the third conductor reduces manufacturing costs and offers greater flexiblity since compatibility with standard connectors presently in use can be retained.

In view of the foregoing it is a general object of the present invention to provide a new and improved electronic system wherein a base station unit communicates with one or more portable units.

It is a more specific object of the present invention to provide such an electronic system wherein the base station unit provides ID code information to the portable units.

It is a still more specific object of the present invention to provide a system wherein a base station unit provides ID code information to a portable unit without the need for modifying existing battery charging interconnections.

SUMMARY OF THE INVENTION

The present invention is directed to an encoding system for use in electronic systems of the type having a base station unit and one or more battery-operated portable units which communicate with the base unit and one another only after ID codes stored within each are compared and found to correspond. Within the base unit, circuitry is included for providing a battery charging current to the portable when the portable unit is electrically mated with the base station unit. The encoding system and method call for modulating the battery charging current in accordance with the code stored in the base station unit, by means of appropriate modulating circuitry, so that the code is carried on the modulated charging current. The modulated charging current is then demodulated by means of appropriate demodulating circuitry within the portable unit to retrieve the code information carried on the modulated charging current, whereupon it is stored within the portable unit.

A system utilizing this invention could also be one wherein other types of data are required to be sent to the portable unit during charging, either following or without an ID code transmission.

BRIEF DESCRIPTION OF THE DRAWINGS

FIG. 1 is a perspective view of a portable telephone system incorporating a security address encoding system constructed in accordance with the invention.

FIG. 2 is a cross-sectional view of the unit illustrated in FIG. 1 taken along line 2—2 thereof showing details of the battery charging electrical contact arrangement between the portable and base station units.

FIG. 3 is an electrical block diagram of the portable telephone system illustrated in FIG. 1 useful in understanding the operation of the security address encoding system.

DESCRIPTION OF THE PREFERRED EMBODIMENT

Referring to the drawings, and particularly to FIG. 1, a cordless telephone communication system 10 is illustrated. As shown, the system includes a base station unit 11 and a battery-operated encodable portable unit 12, separable from one another, and individually contained within separate housings 14 and 15, respectively, fashioned from molded plastic or similar such material. The upper surface 16 of the base station unit 11 includes a shallow depression or recess 17 conforming generally to the shape of the portable unit thereby allowing the portable to be contained in the recess while not in use. The portable unit is fashioned in the form of a telephone handset and thus includes a mouthpiece 18 and earpiece 20. To allow use within standard telephone system networks, the under surface 21 of the portable unit includes a touch-tone pad 22 for generating standard telephone system touch-tones.

In use, the base station unit 11 is installed at a fixed location and is connected to a standard telephone system network by means of a cable 24 and conventional telephone line connectors (not shown). When installed in this manner, access to the telephone system is provided whereby the base station can accept signals from and provide signals to other units connected with the telephone system network. The cordless telephone system thus installe provides standard telephone service to a user carrying the portable unit without the need for interconnecting wires. Accordingly, a great degree of mobility is provided to the user of the cordless telephone system. To allow such mobility, the base and portable units each include a duplex transceiver and antenna which together provide a wireless communication link between the two units.

In order to supply the electrical power needed to energize the circuitry of the portable unit during portable operation, the unit is provided with a battery of conventional construction. Preferably, the battery may be recharged through application of a suitable DC charging current. Such a charging current may be applied to the portable unit by means of a pair of electrical contacts 25 and 26. Referring to FIG. 2, contacts 25 and 26 are seen to be spaced apart from one another and to project through suitable apertures 27 and 28 in the housing to provide electrical communication through the housing to the interior region thereof. Typically, the contacts are fashioned from steel, copper or similar conductive material and may be plated with some suitable non-reactive material, such as gold, in order to preclude tarnishing of the contact surfaces. The base station unit is similarly provided with a pair of spring-loaded contacts 30 and 31 along an interior wall 32 of the recess 17, positioned as to engage contacts 25 and 26 when the portable is inserted in the recess. The base unit contacts 30 and 31 are constructed of materials similar to those used in the portable unit and are arranged so as to positively engage the contacts of the portable unit, thereby assuring a low resistance electrical connection between the portable unit and the base station unit.

In order to reduce undesirable interference between units which may be operating on the same frequency, as well as in order to provide a degree of security to communications between base station unit and its associated portable units, the cordless telephone communication system is arranged so that electrical identification (ID) codes or security addresses stored within both the base station and portable units are compared and found to have proper correspondence to one another prior to establishing a communication link between the units. To this end, the base station unit is provided with some form of read only memory (ROM) in which a previously selected ID code or security address, preferably unique to that base station unit, is stored. Examples of such ROM's include hard-wired circuitry, fusible link code plugs, or any of a variety of similar data storage devices. When properly actuated, such devices produce a unique combination of logic HIGH and logic LOW signals at their output terminals in accordance with the ID code stored within.

To allow the portable unit to properly identify itself to the base station prior to establishing the communication link, the portable includes suitable memory circuitry for storing an address code which corresponds to that of the base station unit with which it is desired to establish communication. In use, the code stored within the portable unit is retrieved from memory and is transmitted to the base station unit whereupon, in known manner, it is compared with the code stored in the base station unit. If proper correspondence between the codes exists, the base station, in accordance with conventional practice, return transmits an appropriate "hand shake" signal to the portable to establish the communication link, thereby permitting subsequent information transfer between the units. The operation of this security system is described in detail in the previously identified copending application of Hawkins, Ser. No. 558,738.

In security address communication systems it is necessary that corresponding address codes be properly stored within the base unit and each portable unit used therewith. The present invention is directed to an encoding system whereby the ID code stored within the base unit is automatically transferred for storage in the portable unit when the portable unit is electrically mated with the base station unit during the battery charging cycle. When the portable is encoded in this manner, it is not necessary to manually enter a code into its memory. Furthermore, since the ID data transfer takes place over existing charging circuit conductors, no additional wiring between the base station and portable unit is required.

FIG. 3 shows in greater detail the configuration of a security address encoding system constructed in accordance with the invention. Referring to the Figure, the base station and portable units 11 and 12 contain transceiver circuits 34, 35 respectively and antennas 36 and 37 respectively, which, in a known manner, provide wireless communication between the units.

As previously developed, the portable unit 12 includes within its housing 15 a rechargeable battery 38 for supplying electrical energy during portable operation of the unit. In order to recharge the battery, the base station includes a battery charge current source 40 of known construction which serves to convert conventional 120 volt 60 Hz. electrical energy supplied through line 41 to a filtered and regulated unidirectional current suitable for application to the battery 38. The battery charge current is applied to the portable by means of the previously described battery charging contacts 25, 26, 30 and 31 included in both the base station and portable units.

Within the portable unit 12, the negative polarity battery charging contact 26 is connected to circuit ground. The positive polarity battery charge current contact 25 is connected to the anode of forward-biased diode 42, the cathode of which is connected to the positive polarity terminal of the rechargeable battery 38. Charge current flows when voltage at contact 25 is greater than the battery voltage. If the contact voltage is less than the battery voltage, the diode is reverse-biased to prevent reverse current flow.

As is further illustrated in FIG. 3, the portable unit 12 includes an encodable memory 44 which is capable of accepting and storing an incoming address code for subsequent retrieval and further use by the portable unit. As illustrated, the memory 44 includes an input circuit 45 which, when provided with serial input data, suitably conditions the data for application to an address code register 46 for storage therein. The address code register 46 accepts data from the input circuit 45 and stores the data until a suitable reset signal, generated by the input circuit and applied to a reset line 47, is received. Similarly, a transfer signal, generated by the input circuit 45 and applied to the address code register 46 through a transfer line 48, causes data currently stored in the address code register to appear in binary form at the output lines 50 of the register.

In order to perform the necessary comparison between the codes stored in the base and handheld units, and to control other functions of the units, the base and the portable units contain microprocessors 51 and 52 respectively.

In order to transfer the base unit address code to the portable for storage therein, the base unit, in accordance with the invention, is provided with means for modulating the battery charging current it supplies to the portable. Such means take the form of circuitry for uniquely periodically interrupting charge current flow in accordance with the code stored in a ROM 54 included in the base unit. In addition, such means include means for sensing the flow of charge current in order to produce a signal for enabling the modulation circuitry.

As further illustrated in FIG. 3, the base unit charging current modulation circuitry includes a PNP transistor 55, the emitter of which is connected to the positive polarity output terminal of the battery charge current source 40 and the collector of which is connected through a resistor 56 to the positive polarity battery charging contact 30. The base of transistor 55 is connected through a resistor 57 to the collector of an NPN transistor 58 the emitter of which is connected directly to circuit ground. The base of transistor 58 is connected through a resistor 60 to the data output terminal 61 of an address code generator 62, which, in a manner to be described, produces an information carrying logic word conforming to the code stored in ROM 54. A logic HIGH signal appearing at terminal 61 biases transistor 58 on into saturation, thereby grounding the base of transistor 55 through resistor 57 with the effect that transistor 55 is biased into conduction, allowing battery charge current to pass to the portable unit. A logic LOW appearing at the data output terminal 61 biases transistors 58 and 55 off, thereby interrupting the flow of charging current to the portable unit.

The current sensing means, which detect the passage of charging current to the portable and provide an enable signal in response thereto, include a second PNP transistor 64. The emitter of this transistor is connected to the collector of transistor 55. The collector of transistor 64 is connected to an input terminal of the base microprocessor 51. The base of transistor 64 is connected through a resistor 65 to + polarity battery charging contact 30. A resistor 66 is connected between the collector of transistor 64 and circuit ground. When charge current flows in the battery charging circuit, the resulting voltage drop across resistor 56 biases transistor 64 on, thereby allowing the positive polarity battery charging current signal to be applied through the transistor 64 to the charge sense input terminal of the microprocessor. When battery charge current is not present, transistor 64 is turned off with the result that the microprocessor charge sense input terminal is biased low by resistor 66. When the passage of charge current is thus detected, the charge sense signal applied to the microprocessor signals the microprocessor to generate in a known manner an enable signal which is applied to the address code generator 62 through an enable line 67.

The address code generator 62 produces an appropriate string of data bits in response to the code stored within ROM 54. To this end, the data outputs of the ROM 54 are applied to input terminals of the address code generator 62 in parallel form. The address code generator converts the ID code information into a serial string of information bits which, when applied through resistor 60 to the base of transistor 58, controls the passage of charge current through transistor 55 in accordance with the pulse string thus generated to produce the modulated battery charging current.

To recover the address code information carried on the modulated battery charging current, the portable unit 12 includes a resistor 68 connected between the positive polarity contact 25 and circuit ground. When battery charging current is applied to the portable unit through contact 25, the battery charge voltage appears across the resistor 68. When charge current is removed, voltage across the resistor falls to zero. Thus, the voltage developed across the resistor varies in response to modulation of the battery charging current. This signal, when applied to input circuit 45 through data input line 70, is stored in address code register 46.

In the circuit described, the base unit microprocessor 51 provides an enable signal 67 to the address code generator 62 whenever a charge sense signal generated by transistor 64 is applied to the charge sense input of the microprocessor. Thus, so long as battery charging current passes to the portable unit the charging current will be repetitively modulated by the ID code data string. Accordingly, it is necessary to signal the portable unit circuitry when a completed data string has been received and is thus suitable for storage in the address code register. To this end, the address code generator 62 is arranged to generate data words each consisting of a fixed number of bits, and adapted to carry synchronization information as well as address code data. For example, in the system described, a 25 bit word is used to carry information between the base and portable units. Of these bits, the first 5 are synchronizing bits, and the last 20 bits carry the ID code information.

When enabled, the address code generator 62 produces a unique 5-bit sequence at the beginning of each word. In the portable unit 15, the input circuit 45 is arranged to recognize the unique 5-bit synchronization sequence. When this sequence is recognized, the previously mentioned reset pulse is applied to the address code register, thereby erasing the contents previously stored therein, and conditioning the register to accept and retain the immediately following 20 bits containing the address code information. When the 20 address code bits have been received and applied to the address code register 46, the input circuit 45 provides a transfer signal to the address code register along the transfer line 48 which causes the register to transfer the address code information to the portable unit microprocessor 52. Upon subsequent receipt of the appropriate 5-bit synchronization sequence, the cycle begins anew.

In actual practice, because of the relatively long time constants involved, a relatively slow data transfer rate is preferably utilized. By way of example, a rate of one bit per second is adequate to reliably transfer ID code information from the base unit for encoding the portable unit. Since one to two hours are typically required to fully charge the portable unit's battery, sufficient time to transfer the ID code many times over is available despite the relatively slow data transfer rate. To improve charging efficiency, the code may be transferred to the portable unit on a periodic rather than continuous basis. For example, the system may be adjusted to transfer the code once every fifteen minutes thereby increasing the effective charge rate. The base station, once enabled, will continue to cycle the code modulation until the portable unit is removed from charge.

While the address code generator 62 and microprocessor 51 of the base unit are illustrated as separate circuits, it will be appreciated by those skilled in the art that a single microprocessor, suitably programmed, could perform the function of the address code generator in accepting serial or parallel ID code information from memory, generating the required synchronization code sequence and serially applying the ID code word through the resistor to the base of transistor. Similarly, within the portable unit, a single, suitably programmed microprocessor could perform the functions of the input circuit and address code register. Additionally, it will be appreciated that formats other than the 25 bit word discussed herein could be utilized without requiring any modification of the modulating and demodulating portions of the circuit. Furthermore, circuitry of a configuration other than that described herein could equally well perform the function of interrupting the battery charging current in response to the data bit string produced by the address code register.

While for illustrative purposes the invention has been described in conjunction with a cordless telephone system, it will be appreciated that the technique of modulating and demodulating battery charge current supplied by a base station unit to a battery operated portable unit for storage therein may be adapted to any such system wherein a battery operated portable unit, recharged by being periodically electrically mated with the base station unit, subsequently communicates with the base unit from a remote location. For example, a portable garage door opener, stored and recharged by being placed in a suitable socket of the receiver unit might equally well employ an encoding system of the type described herein.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An encoding system for use in electronic message transmission systems of the type having a base station unit and one or more battery operated portable units in which the base station unit provides a charging current for charging the battery of the portable unit and in which a code stored in the base station unit is compared with an assigned code stored in the portable unit before a message transmission can be decoded, comprising:
    means associated with the base station unit for modulating the charging current in accordance with the code stored in the base station unit; and
    means associated with the portable unit for demodulating the modulated charging current to retrieve the code information contained thereon and for storing a code corresponding to the demodulated code information within the portable unit, said code stored in said portable unit thereby becoming the assigned code of said portable unit.

2. An encoding system as defined in claim 1 wherein said encoding system further includes sensing means for sensing the flow of charging current and providing an enable signal in response to the flow of charging current for enabling said modulating means.

3. An encoding system as defined in claim 1 wherein said modulating means periodically interrupt the charging current in accordance with the code stored in the base unit.

4. A method for assigning a code to a battery-operated portable unit used in an electronic message transmission system of the type having a base station unit and one or more battery-operated portable units, in which system the base station unit provides a charging current for charging the battery of the portable unit and in which a code stored in the base station unit is compared with an assigned code stored in the portable unit before message transmission between the base station and portable units, said method of comprising the steps of:
    applying the charge current provided by the base station unit to the portable unit;
    modulating the charge current in accordance with the code stored in the base station;
    demodulating the charge current to retrieve the code information transmitted thereon; and
    storing a code corresponding to the retrieved code as the assigned code within the portable unit.

5. A method as defined in claim 4 wherein the charge current is modulated by means of periodically interrupting the charge current in accordance with the code stored in the base station.

6. A method as defined in claim 5 wherein the method further comprises the step of sensing the passage of charging current to the portable unit and allowing said modulation of the charging current in response thereto.

7. A method as defined in claim 6 wherein the method further comprises the steps of:
    converting the code stored in the base station unit to form a word, said word comprising a series of logic bits, each of said logic bits being in one or the other of two states whereby each unique code stored in the base station unit results in the formation of a unique series of logic bits; and modulating the charge current in accordance with said word thus formed, said modulation comprising applying charge current in response to each bit of one state of said two states and interrupting the charge current in response to each bit of the other state of said two states whereby each unique code stored in the base station unit results in a unique sequence of application and interruption of the charge current provided by the base station unit.

8. A method as defined in claim 7 wherein said word further includes a series of synchronization logic bits for signing the beginning or end of said word thus formed.

9. In an electronic message transmission systm of the type having a base station unit and one or more battery-operated portable units in which the base station unit provides a charging current for charging the battery of the portable unit and in which a code stored in the base station unit is compared with an assigned code stored in the portable unit before message transmission between the base station and portable units, the base station unit further including means for modulating the charging current in accordance with the code stored therein, a portable unit comprising:

a battery for receiving the modulated charging current;

demodulating means in circuit relationship with said modulated charging current for demodulating said modulated charging current to retrieve the code information carried thereon; and.

security address circuitry including means for storing in the portable unit a code corresponding to said retrieved code information, said code stored in said portable unit becoming the assigned code of the portable unit.

10. In an electronic message transmission system of the type having a code-secured base station unit and one or more battery operated portable units in which the base station unit provides a charging current for charging the battery of the portable unit and in which a code stored in the base station unit is compared with an assigned code stored in the portable unit before message transmission between said base station and portable units, the portable unit further including demodulating circuitry responsive to modulation of the charging current in order to retrieve the code information carried thereon, said demodulated code information corresponding to and determining the assigned code of said portable unit, the base station unit comprising:

charging circuit means for producing said charging current;

storage means for storing said code in said base station; and modulating means for modulating said charging current in accordance with said code stored in said storage means whereby said code information carried on said charging current determines the assigned code of the portable unit.

11. A code-secured base station unit as defined in claim 10 wherein said encoding system further includes sensing means for sensing the flow of charging current, said sensing means providing an enable signal in response to the flow of charging current for enabling said modulating means.

12. A code-secured base station unit as defined in claim 10 wherein said modulating means periodically interrupt the charging current in accordance with the code stored in the base station unit.

13. A code-secured communication system, comprising:

a portable unit including a rechargeable battery;

a base station unit having a receptacle for receiving said portable unit and having a source of battery charging current;

contacts on said portable unit and within said receptacle for establishing electrical communication between said battery and said source;

a security circuit in said portable unit for controlling access to said base station unit, said current including means for storing a code therein as an assigned code of said portable unit;

a security circuit in said base station unit for controlling access to said portable unit, said circuit including code storage means for storing a code therein;

modulating means in said base station unit for modulating the charging current, said modulation being in accordance with the code stored in said base station security circuity; and demodulating means in said portable unit for demodulating the modulated charging current to retrieve the code information contained thereon for determining a code to be stored in said portable unit security circuit as the assigned code.

14. A secured communication system as defined in claim 13 including sensing means in said base station unit for sensing the flow of charging current, said sensing means providing an enable signal in response to the flow of charging current for enabling said modulating means.

15. An encoding system as defined in claim 1 wherein said base station unit and said portable unit each include apparatus for establishing a wireless communication link therebetween, the establishment of said link being in response to effective comparison of said code stored in said base station unit with said assigned code stored in said portable unit.

16. An enclodlng system as defined in claim 15 wherein said modulating means is automatically enabled in response to sensing the occurrence of a predetermined connection between the base station and portable units.

17. A method as defined in claim 4 which includes the step of establishing a wireless communication link between said base station and portable units, the establishment of said link being in response to effective comparison of said code stored in said base station unit with said assigned code stored in said portable unit.

18. A portable unit as defined in claim 9 which includes wireless communication apparatus in said portable unit for communicating between said base station and portable units at least in response to the effective comparison of said code stored in said base station unit with said assigned code stored in said portable unit.

19. A code-secured base station unit as defined in claim 10 which includes wireless communication apparatus in said base station unit for communicating between said base station and portable units in response to at least the effective comparison of said code stored in said base station unit with said assigned code stored in said portable unit, and wherein said modulating means is automatically enabled by sensing the occurrence of a predetermined connection between the base station and portable units.

20. A code-secured communication system according to claim 13 wherein each of said base station and portable units include apparatus for establishing a wireless communication link therebetween, the establishment of said link being in response to effective comparison of said code stored in said base station unit with said assigned code stored in said portable unit.

21. An encoding system for use in electronic message transmission systems of the type having a base station unit and one or more battery operated portable units, separate from the base station unit but in wireless communication therewith when separated therefrom, and in which the base station unit provides a charging current for charging the battery of the portable unit, comprising:
   means associated with the base station unit for modulating the charging current in accordance with information stored in the base station unit; and
   means associated with the portable unit for demodulating the modulated charging current to retrieve the information contained thereon and for storing information corresponding to the demodulated information within the portable unit.

22. An encoding system as defined in claim 21 wherein said base station unit and said portable unit each include apparatus for establishing a wireless communication link therebetween.

23. A communication system, comprising:
   a portable unit including a rechargeable battery;
   a base station unit selectively in communication with said portable unit;
   charging apparatus having a receptable for selectively receiving said portable unit and having a source of battery charging current, said charging apparatus and portable unit being separable;
   contacts on said portable unit and within said receptacle for establishing electrical communication between said battery and said source for charging said battery;
   means in at least one of said charging apparatus and said portable unit for sensing information signals between said portable unit and said charging apparatus via said battery charging electrical communication contacts on said portable unit and said receptable; and
   means in another of said charging apparatus and said portable unit for retrieving said sent information signals and for utilization thereof.

24. A communication system according to claim 23 wherein each of said base station and portable units include apparatus for establishing a wireless communication link therebetween, the establishiment of said link being in response to effective comparison of codes stored in said base station unit and in said portable unit.

25. A communication system according to claim 24 wherein said charging apparatus is within and part of said base station unit.

26. A communication system according to claim 25 wherein said portable unit is a telephone handset.

* * * * *